United States Patent
Kanno

(10) Patent No.: US 7,561,140 B1
(45) Date of Patent: Jul. 14, 2009

(54) MICROCAPSULE MAGNETIC MIGRATION DISPLAY

(75) Inventor: Yasuyuki Kanno, Kanagawa-ken (JP)

(73) Assignee: Japan Capsular Products, Inc., Tokyo (JP)

( * ) Notice: Subject to any disclaimer, the term of this patent is extended or adjusted under 35 U.S.C. 154(b) by 0 days.

(21) Appl. No.: 12/230,846

(22) Filed: Sep. 5, 2008

(30) Foreign Application Priority Data

Jun. 9, 2008 (JP) ............................. 2008-150038

(51) Int. Cl.
*G09G 3/34* (2006.01)

(52) U.S. Cl. ......................... 345/108; 345/85; 345/86; 345/107

(58) Field of Classification Search ............. 345/48–50, 345/84–86, 104–111; 349/23, 62; 428/68–76, 428/321–330, 384, 692
See application file for complete search history.

(56) References Cited

U.S. PATENT DOCUMENTS

| 5,846,630 | A | * | 12/1998 | Tazaki et al. ................... 428/68 |
| 7,027,030 | B2 | * | 4/2006 | Kanno ......................... 345/108 |
| 2009/0093180 | A1 | * | 4/2009 | Park et al. .................... 442/353 |

FOREIGN PATENT DOCUMENTS

| JP | 02-146082 | 6/1990 |
| JP | 04-233581 | 8/1992 |
| JP | 10-197908 | 7/1998 |
| JP | 2001-083911 | 3/2001 |
| JP | 2003-195365 | 7/2003 |
| JP | 2006-227521 | 8/2006 |

* cited by examiner

*Primary Examiner*—Vijay Shankar
(74) *Attorney, Agent, or Firm*—Wenderoth, Lind & Ponack, L.L.P.

(57) ABSTRACT

Provided is a microcapsule magnetic migration display including microcapsules arrayed on a substrate. A dispersion liquid containing an oily dispersion medium having two components of light-absorptive magnetic particles and light-reflective non-magnetic particles dispersed therein is encapsulated in the microcapsules, and positions of the two components are allowed to vertically migrate by a magnetic field. The dispersion liquid is one or two or more kinds of oily liquids having a flash point of 70° C. or more, a volume density at 15° C. of 0.75 to 0.91 $g/cm^3$, and a dynamic viscosity at 40° C. of 7 $mm^2/S$ or less, is added with 0.5 to 8.0 wt % of non-ionic surfactant with an HLB value of 5.0 or less, and is added with solid particles having a true specific gravity exceeding 1.0 and a particle diameter of 0.1 to 30 μm, thereby adjusting the volume density thereof at 15° C. to 1.0 to 1.2 $g/cm^3$.

5 Claims, No Drawings

MICROCAPSULE MAGNETIC MIGRATION DISPLAY

BACKGROUND OF THE INVENTION

1. Field of the Invention

The present invention relates to a microcapsule magnetic migration display.

2. Description of the Related Art

A microcapsule magnetic migration display is developed and commercialized based on Japanese Patent Application Laid-open Nos. Hei 02-146082 and Hei 04-233581, which are filed by the applicant of the present application.

Japanese Patent Application Laid-open No. Hei 10-197908 discloses a microcapsule for a magnetic display and a magnetic display plate using the microcapsule, in which a low boiling point solvent and a high boiling point solvent are combined as a dispersion medium in the microcapsule, and the respective boiling point ranges and viscosities are defined, thereby attaining higher image forming and erasing speed, providing bright character and image having stability, and being excellent in durability.

Japanese Patent Application Laid-open No. 2001-83922 describes that, in addition to a mixed use of the low boiling point solvent and the high boiling point solvent as the dispersion medium in the microcapsule, particle diameters of white pigments and magnetic particles are substantially the same, and describes about a range of addition ratio of the magnetic particles and the white pigments with respect to the dispersion medium and a range of ratio of the white pigments with respect to the magnetic particles. Japanese Patent Application Laid-open No. 2001-83911 also discloses a thin display sheet in which an average particle size of the microcapsules is made small, and an improvement thereof is carried out so that, although the conventional image forming is performed from a display surface side, and the erasing is performed from a back surface side, in the thin display sheet of this invention, both the image forming and the erasing may be performed from the display front surface side.

Japanese Patent Application Laid-open No. 2003-195365 describes that, in addition to the mixed use of the low boiling point solvent and the high boiling point solvent as the dispersion medium in the microcapsule, the diameter range of the magnetic particles and a mixing ratio range are defined, and further describes that the image formed can be erased from the display front surface side.

Japanese Patent Application Laid-open No. 2006-227521 discloses a magnetic inversion display medium containing micro magnetic substances classified by colors through coloring of magnetic poles with different colors. This is a similar technology in that the microcapsule contains the magnetic particles, and particle size distribution of the contained micro magnetic substances, a ratio of an inner size of the microcapsule, and an outer size diameter range and the particle size distribution of the microcapsule are disclosed.

Conventionally, as a dispersion medium of a microcapsule-encapsulated dispersion liquid of the microcapsule magnetic migration display, it is thought that a dispersion medium which is a high boiling point solvent, and has a volume density at 15° C. of 0.91 to 1.10 g/cm$^3$ is preferred. In order to enhance moving speeds of both particles of the magnetic substance and the non-magnetic substance in the microcapsule by adjusting the viscosity of the dispersion medium to be lower, the solvent having a lower volume density than the above-mentioned solvent may be mixed therein. However, the optimal low volume density of the microcapsule-encapsulated dispersion liquid is considered to be 1.0 g/cm$^3$.

Even if the volume density of the microcapsule-encapsulated dispersion liquid is 1.0 g/cm$^3$ or less, formation of the microcapsules is still possible. However, because the volume density is low, oil droplets dispersed during the formation of the microcapsules under the forming process are liable to float. Then, if the oil droplets or the microcapsules being dispersed in a process tank tend to move upward to a gas-liquid interface region in the tank during the forming process, resulting in causing of yields at the time of mass-production.

In any of Japanese Patent Application Laid-open Nos. Hei 10-197908, 2001-83922, and 2003-195365, as the dispersion medium of the microcapsule-encapsulated dispersion liquid, the low boiling point solvent and the high boiling point solvent are used as a mixture. However, the low boiling point solvent has an inflammatory risk, and a toxic risk due to inhalation of vapor of an organic solvent. Besides, in a production facility, an explosion-proof facility and an organic solvent recovery/treatment facility are required to install. In addition, the low boiling point solvent requires not only measure for safety, but also has a risk of causing an injury to an end user owing to such a hazardous substance contained in a final product, and thus being conceived as problems.

With regard to the high boiling point solvent, there are many concerns as follows. Phthalic ester, adipic acid bis(2-ethylhexyl), and the like are specified as class I designated chemical substances of Pollutant Release and Transfer Register (PRTR) system due to suspicion on environmental hormone. Besides, the component of Nisseki Hizol SAS-296 (manufactured by Nippon Oil Corporation), which is frequently used as a solvent for dispersing an oil droplet to be encapsulated, is specified as class II and class III monitoring chemical substances according to the Law Concerning the Examination and Regulation of Manufacture etc. of Chemical Substances (Japanese Chemical Substances Control Act), and is hardly decomposable, thereby being anxious about influence to environment.

Under the above-mentioned circumstances, with respect to the dispersion medium used for the microcapsule magnetic migration display, the supply of a dispersion medium, which is safe and harmless, has low toxicity, and achieves high yield mass production is required. Also required is a research to obtain an appropriate material by pursuing a technology for adjusting physical properties of available disperse medium.

In Japanese Patent Application Laid-open No. Hei 04-233581, a minimum particle size of the microcapsule is defined as 100 μm. However, as the particle size becomes smaller, distances between top portions and bottom portions of the respective microcapsules are made shorten, and hence degree of opacity of a layer consisting by the magnetic substances and the non-magnetic substances inside of the microcapsules become insufficient. As a result, a color contrast between the image formed on the display surface and a background portion becomes insufficient, and hence, conventionally, the lowest limitation of the particle size of the microcapsule must be set to 100 μm.

In Japanese Patent Application Laid-open No. 2001-83922, the particle size of the microcapsule is defined as smaller as 30 to 170 μm. In this particle size, the distance between the top portion and the bottom portion of the microcapsule becomes narrower, and hence it becomes difficult to hide a color of the magnetic substance layer or the non-magnetic substance layer existing at the bottom portion with the non-magnetic substance layer or the magnetic substance layer existing at the upper portion, resulting in a gradation of a gray color at the surface of the display. However, in this laid-open patent application, there is no disclosure about means for supplementing the critical insufficiency of the degree of the opacity.

In Japanese Patent Application Laid-open No. 2001-83922, too, there is described that both the image forming and erasing can be carried out by a magnetic field applied thereto from a front surface side. However, according to this invention, if the magnetic field for erasing the character or the image formed on the front surface side of the display is applied from the same front surface side, cohesion of light-absorptive magnetic particles, which are cohered for the formation of the image, are released to be diffused. As a result, the light-absorptive magnetic particles are mixed into one with the light-reflective non-magnetic particle layer existing as a base layer, and hence the display becomes a gray color when viewed from the display front surface side, resulting in being not a state called an erased surface. Specifically, in this invention, there is not described means for solving such a problem that the magnetic substance particles are spreadly diffused due to the magnetic field applied at the time of erasing the image formed from the front surface side, and hence a white color and a black color are mixed to cause the display surface to be gray.

In the invention disclosed in Japanese Patent Application Laid-open No. 2001-83922, there is described a conventional phrase, "the present invention is not limited to Examples," to expand the technical scope of the invention. Further, components and their compounding ratio of the microcapsule-encapsulated dispersion liquid disclosed in example of this invention are completely the same with that of Japanese Patent Application Laid-open No. 10-197908. However, in Japanese Patent Application Laid-open No. 2001-83922, there is described as if the object to make thinner the microcapsule magnetic migration display sheet after its completion may be achieved by merely reducing the particle size of the microcapsule. As described above, however, unless otherwise any technical alternation is added to the structure of the microcapsule-encapsulated dispersion liquid, it is obvious that, compared with the display obtained in Japanese Patent Application Laid-open No. Hei 10-197908, quality of the microcapsule magnetic migration display sheet as disclosed in Japanese Patent Application Laid-open No. 2001-83922, namely, a performance to achieve further clarity of a white color degree and a black color degree by opacifying the white color and the black color with each other is further degraded as the particle size of the microcapsule is further reduced correspondingly, thereby being not yet achieved the effect which this invention seeks.

As described above, although Japanese Patent Application Laid-open No. 2001-83922 mentions that the object to make a thickness of the display sheet thinner may be achieved by merely reducing the particle size of the microcapsule, but in reality, the image forming quality of the display (for clarifying the image formed through the opacifying power between the light-absorptive magnetic particles and the light-reflective non-magnetic particles) is forced to be sacrificed by merely reducing the particle size of the microcapsule, thereby being far from a solution of the object to make the display sheet thinner.

SUMMARY OF THE INVENTION

It is an object of the present invention to provide a microcapsule magnetic migration display, which is excellent in contrast, durability, safety, and productivity, by expanding choices of a dispersion medium of a microcapsule-encapsulated dispersion liquid, and enabling a use of a dispersion medium having higher safety as well as enabling a production of a microcapsule with higher performance with high yields.

In order to attain the above-mentioned object of the present invention, according to a first aspect of the invention, there is provided a microcapsule magnetic migration display, in which a plurality of microcapsules, in which a dispersion liquid containing an oily dispersion medium having two components of light-absorptive magnetic particles and light-reflective non-magnetic particles dispersed therein is encapsulated to form a microcapsule-encapsulated dispersion liquid, are arrayed on a substrate, and positions of the two components in the dispersion medium are allowed to vertically migrate in the microcapsules by a magnetic field applied from outside the substrate, to thereby form character or image of a black color on a white color or the white color on the black color, respectively, or erase therefrom, wherein:

(1) the microcapsule-encapsulated dispersion liquid comprises one kind or two or more kinds of oily liquids having a flash point of 70° C. or more, a volume density at 15° C. of 0.75 to 0.91 g/cm$^3$, and a kinematic viscosity at 40° C. of 7 mm$^2$/S or less;

(2) the microcapsule-encapsulated dispersion liquid is added with 0.5 to 8.0 wt % of non-ionic surfactant with an HLB value of 5.0 or less, which is liquid under room temperature; and (3) to increase the volume density of the microcapsule-encapsulated dispersion liquid, the microcapsule-encapsulated dispersion liquid is added with solid particles having a true specific gravity exceeding 1.0 and having a particle diameter of 0.1 to 30 µm, to thereby adjust the volume density of the microcapsule-encapsulated dispersion liquid at 15° C. to 1.0 to 1.2 g/cm$^3$.

According to a second aspect of the present invention, in the first aspect of the invention, the dispersion medium of the microcapsule-encapsulated dispersion liquid includes a mixture of one kind or more kinds selected from normal paraffins, isoparaffins, and naphthenes.

According to a third aspect of the present invention, in the first or the second aspect of the invention, the solid particles which are added to increase the volume density of the microcapsule-encapsulated dispersion liquid includes a mixture of the light-absorptive magnetic particles and the light-reflective non-magnetic particles.

According to a fourth aspect of the present invention, in the third aspect of the invention, a particle size range of the microcapsule is 30 to 180 µm.

According to the present invention having the above-mentioned structure, even if the dispersion medium having a physical property of a lower volume density is used, the microcapsules with high yields can be manufactured, and hence the choices that relate to the performances of the microcapsule magnetic migration display may be expanded to a melting point, a refractive index, and the like other than the flash point of the dispersion medium, the volume density, and the kinematic viscosity. As a result, the dispersion medium with more safety may be available to use, thereby being capable of obtaining a microcapsule magnetic migration display, which is excellent in color image contrast, durability, and safety than the conventional ones.

Further, as the solid particle to be used for the adjustment of the volume density, the light-absorptive magnetic particles and the light-reflective non-magnetic particles, which are basically used for the purpose of forming the image or the character, are concurrently used, with the result that, in the addition of the solid particle used for the purpose of adjusting the volume density, the addition amount of foreign materials which do not contribute to magnetic migration can be minimized. As a result, the lowering of the clarity of the black color/white color and the lowering of the color contrast, which are inevitably occurred in making the particle size of the microcapsule small, can be ultimately minimized.

Specifically, in the color contrast, while keeping the clarity, which is equivalent to that of the conventional microcapsule magnetic migration display, the particle size of the microcapsule can be made small. As a result, there can be obtained a display which is excellent in flatness of the display front surface, physical strength for pressure resistance, and image forming quality, and is suited for thinning, thereby being capable of expanding applications of the display.

DETAILED DESCRIPTION OF THE PREFERRED EMBODIMENT

Hereinafter, description is made of an embodiment of a microcapsule magnetic migration display according to the present invention, but is not limited thereto.

A microcapsule magnetic migration display according to the present invention is a display, in which a plurality of microcapsules, in which a dispersion liquid containing an oily dispersion medium having two components of light-absorptive magnetic particles and light-reflective non-magnetic particles dispersed therein is encapsulated, are arrayed on a substrate, and positions of the two components in the dispersion medium are allowed to vertically migrate in the microcapsules by a magnetic field applied from outside the substrate, to thereby form character or image of a black color or a white color on the white color or the black color, respectively, or erase therefrom, and is characterized in that a composition of the microcapsule-encapsulated dispersion liquid includes: a dispersion medium of one kind or two or more kinds of mixture having a flash point of 70° C. or more, a volume density at 15° C. of 0.75 to 0.91 g/cm$^3$, and a kinematic viscosity at 40° C. of 7 mm$^2$/S or less, the microcapsule-encapsulated dispersion liquid being added with 0.5 to 8.0 wt % of non-ionic surfactant with an HLB value of 5.0 or less, which is liquid under room temperature, the microcapsule-encapsulated dispersion liquid being added with solid particles having a true specific gravity exceeding 1.0 and having a particle diameter of 0.1 to 30 μm, to thereby adjust the volume density of the microcapsule-encapsulated dispersion liquid at 15° C. to 1.0 to 1.2 g/cm$^3$; further optionally, known light-absorptive magnetic particles; known light-reflective non-magnetic particles; known anti-settling agent; and various additives if required.

The dispersion medium used in the present invention satisfies the above-mentioned conditions. Specifically, the dispersion medium belongs to fire protection law (dangerous substance classification) type 4 dangerous substance, type 3 petroleum product oil, and has a specified volume density and is within a specified viscosity. Examples thereof include aliphatic hydrocarbon, aromatic hydrocarbon, and fatty acid ester, which are on the market as solvents, lubricant oils, and detergents.

In the case where the volume density of the dispersion medium at 15° C. exceeds 0.91 g/cm$^3$, microencapsulation by a known method is possible. However, in the case where the kinematic viscosity of the dispersion medium at 40° C. exceeds 7 mm$^2$/S, the mobility (magnetic migration speed) of the light-absorptive magnetic particles within the microcapsule containing therein dispersion medium remarkably degrades.

When the selection of the dispersion medium is performed, because the dispersion medium having a smaller molecular weight may sometime hard to be encapsulated into the microcapsule, it is necessary for paying attention to the selection. It is needless to say that the dispersion medium needs to have a high transparency, and to be water-insoluble or extremely insoluble, but to be compatible to surfactant to be used.

In terms of magnetic migration performance within the microcapsule, in addition to the safety as the dispersion medium, the durability of the microcapsule magnetic migration display, and the like, use of one kind or a mixture of normal paraffins, isoparaffins, naphthenes is particularly suited.

For your reference, Japanese Patent Application Laid-open No. 2006-227521 discloses that isoparaffin is suited as the dispersion medium, but is different from the technical field to which the present invention belongs. The present invention is characterized by: assisting microcapsule forming property by using a particular surfactant; improving the mobility of the light-absorptive magnetic particles within the microcapsule adjusting the volume density of the dispersion medium by an addition of a particular solid particles, thereby improving yields of microencapsulation process.

Japanese Patent Application Laid-open No. 2006-227521 is characterized by: coloring one surface and the other surface of relatively large particle of the magnetic substances with different colors; providing two magnetic poles of N and S and encapsulating the magnetic substances into macrocapsules; arraying the macrocapsules in plane to form a display surface; applying a magnetic field from one of the upper and lower surface of the display surface to selectively orient N pole and S pole on the surface side; and forming characters using the colored color. Accordingly, the technical field differs from the magnetic migration display of the present invention in which the magnetic substance particles within the microcapsules are cohered magnetically to form the characters and/or images. Further, in Japanese Patent Application Laid-open No. 2006-227521, sizes of the magnetic substances to be encapsulated into the microcapsule, which are polarized into N pole and S pole, are considerably larger than that of the magnetic substance particles of the present invention, resulting in being difficult to form the microcapsules, and there is no description about means for solving the problem having technical difficulty, for example, an emulsifying dispersion method for uniformly encapsulating the magnetic substances into the respective microcapsules.

As the surfactant to be used in the present invention, there is given a non-ionic surfactant with an HLB value of 5.0 or less, which is liquid under room temperature. Examples of the non-ionic surfactant include sorbitan trioleate, sorbitan monoleate, sorbitan sesquioleate, and glycerol monoleate, and they may be used alone or by mixture. Further, even if the mixture is made with a surfactant having an HLB value exceeding 5.0, the surfactant may be used as long as the HLB value of the mixture product is 5.0 or less. In particular, sorbitan trioleate, which has a small HLB value, is suited.

An ionic surfactant is not suited, because the ionic surfactant dissolves in water and is dissociated into ion, thereby being a disturbance for forming a film of a gelatin microcapsule. HLB is an abbreviation of hydrophile-lipophile balance, and exhibits a balance between the hydrophile and the lipophile. As the HLB value becomes larger, water solubility increases, and as the HLB value becomes smaller, oil solubility increases.

This surfactant has several important functions including, at first, working as a dispersing agent when dispersing the light-absorptive magnetic particles, the light-reflective non-magnetic particles, and the solid particles for the adjustment of the volume density into the dispersion medium, to form a stable dispersing system of those three kinds of solid particles. The surfaces of the light-absorptive magnetic particles, the light-reflective non-magnetic particles, and the solid particles for the adjustment of the volume density in the microcapsule are covered with the surfactant molecules, and hence the surfactant achieves the function of allowing the cohesion, dispersion, and migration of the respective particles within the microcapsule reversibly with high speed.

The surfactant, which is solid under room temperature, may sometime raise the viscosity of the microcapsule-encapsulated dispersion liquid, and causes a sudden viscosity change due to cooling during the microencapsulation process, and hence the use thereof should be avoided. The use of surfactant having an HLB value exceeding 5.0 causes coalescence of oil droplets to be eventually formed a core of the microcapsules in the microencapsulation process, which may prevent from forming the microcapsule with a desired particle size, or forming a wall film of the microcapsule. Further, even if the microencapsulation is achieved, encapsulated particles may be taken in the wall film or attached thereto, resulting in the capsules which may not achieve the function of the magnetic display.

Even in the case where the addition amount of the surfactant with respect to the microcapsule-encapsulated dispersion liquid is below 0.5 wt %, the encapsulated particles attach to the wall film of the microcapsule to cause the lowering of the contrast and the deterioration of mobility of the light-absorptive magnetic particles. On the contrary, if the addition amount exceeds 8.0 wt %, strength reduction of the wall film of the microcapsule occurs.

The functions of the surfactant according to the present invention cover a fairly broad spectrum. First, the surfactant functions as the dispersing agent for uniformly dispersing within the oily dispersion medium two components of the light-absorptive magnetic particles and the light-reflective non-magnetic particles encapsulated in the microcapsule, and in addition thereto, the solid particles to be added for the adjustment of the volume density. Specifically, the surfactant adsorbs to the surfaces of the respective particles to prevent the aggregation from occurring, and provides surface (interface) property which allows the magnetic migration of the respective particles within the dispersion medium. In this case, the molecules of the surfactant serves as a lubricant among the particles, and functions to maintain the mobility of the solid particles including the magnetic substances and the non-magnetic substances within the dispersion medium.

Next, at the time of manufacturing the microcapsules, the microcapsule-encapsulated dispersion liquid, in which the above-mentioned solid particles are dispersed, is agitated and emulsified in a continuous phase of water to obtain liquid droplets having a desired size and capable of being encapsulated in the microcapsules. Then, the liquid droplets are wrapped up into the film of hydrophilic polymer, while being suspended in the continuous phase, thus the microcapsule is completed. The action of the surfactant in this process functions to prevent each of the droplets from coalescencing, and to prevent the respective dispersed solid particles from braking out of the oil droplets to be segregated into the continuous phase or from entering into the wall film of the microcapsule under being formed in the interface.

As the solid particles used in the present invention, for adjusting the volume density of the microcapsule-encapsulated dispersion liquid, there may be used substances having a particle diameter of 0.1 to 30 µm, which are insoluble to water being a continuous phase of a production medium and to the dispersion medium, and are colorless transparent to white color, or pale yellow, having a true specific gravity of 1.0 or more. In the case of coloring the dispersion medium for colorization of the solid particles, there may be used a solid pigment particle to be subjected to the coloring.

As examples of the solid particles capable of being used in the present invention, there are given as a resin bead or a ground product; polymethyl methacrylate, polyacrylic acid ester, a silicone resin, and an epoxy resin; as an inorganic compound aluminum oxide (alumina), calcium carbonate, and barium sulfate; and as a mineral product kaolin, silica (quartz) sand, talc, and perlite.

In the case of the solid particle having a particle diameter of 0.1 µm or less, the total surface area of the solid particle within the dispersion medium increases, to thereby raise the viscosity of the dispersion medium, and hence such solid particle can not be used. Besides, if the solid particle having a particle diameter exceeding 30 µm is used, the solid particle having such a big (giant) particle diameter is liable to sediment, even if it is dispersed with surfactant, in the dispersion medium, resulting in being difficult to be uniformly dispersed.

Even if the particle diameter of the solid particle falls within a specified range, if the addition amount thereof becomes larger, the total surface area of the solid particle results in becoming larger. As a result, the viscosity of the microcapsule-encapsulated dispersion liquid rises, even under existence of the surfactant, and the mobility of the light-absorptive magnetic particles within the microcapsule is markedly is obstructed. Accordingly, the true specific gravity and the particle diameter of the solid particle must be selected in accordance with the volume density of the dispersion medium to be used.

For the solid particle for the adjustment of the volume density, the description is made as described above that the mixture of the light-absorptive magnetic particles and the light-reflective non-magnetic particles may be used. However, the use of the mixture results in increasing the solid particles having an image forming function, and hence it is rather preferred that the particles may be used at the same time for the adjustment of the volume density.

If the adjustment value of the volume density of the microcapsule-encapsulated dispersion liquid by the solid particle falls short of 1.0 g/cm$^3$, an effect of the adjustment is low, resulting in increasing the number of defective microcapsules, and causing problems such as deterioration of yields at the mass production. If the adjustment value exceeds 1.2 g/cm$^3$, the microcapsules are liable to submerge. As a result, the microcapsules precipitate and aggregate during the microencapsulation process. If a water-based ink composition mixed with a binder, etc., is used for coating onto the substrate, the sedimentation of the microcapsules liable to occur, and microcapsule applied layer is hard to be homogeneous. In addition, if the coating liquid is made to have a high viscosity to prevent the sedimentation from occurring in the coating process, there occurs such a problem that bubbles are liable to enter at the mixing of the liquid.

Even in the case where a known dispersion medium having a volume density at 15° C. exceeding 0.91 g/cm$^3$ is used to increase the amount of the mixture of the light-absorptive magnetic particles and the light reflective non-magnetic particles, the solid particles having image forming function increases, and hence even if the particle size of the microcapsules is made smaller, deteriorations of a white color degree, a black color degree, and a contrast may be reduced to some extent. However, the effect is small when the increase amount falls within the adjustment range of the volume density of the microcapsule-encapsulated dispersion liquid, and if the increase amount exceeds the volume density adjustment range, the above-mentioned problem occurs.

For the light-absorptive magnetic particle used in the present invention, a known particle may be used, and a particle having a particle diameter of 0.2 to several μm is used alone or by mixture. Magnetite is generally largely used. However, it is effective to mix little larger particles, or to mix the magnetite containing a ferrite particle or manganese dioxide in partly to enhance the mobility of the light-absorptive magnetic particles and to aggregate densely the light-absorptive magnetic particles. As to whether or not conducting surface treatment, it is not particularly limited.

For the light-reflective non-magnetic particle according to the present invention, known ones may be used, and in general, rutile titanium dioxide having a high opacifying power is largely used. The titanium dioxide, which is commercially available on the market as a white pigment, almost has an average particle diameter of 0.2 to 0.4 μm, and hence the titanium dioxide may be used because of being easy to obtain. As to whether or not conducting surface treatment, and about the kinds of the surface treatment agent, it is not particularly limited.

An anti-sediment agent used in the present invention may be a known one, and in general a hydrophobic silica nanoparticle is largely used. The addition of the anti-sediment agent does not aim to completely prevent the submerge of the microcapsule-encapsulated particles, but aims to delay the submerge, and also has an effect of enhancing redispersibility of the particles which precipitate and aggregate.

Various additives may optionally be added to the microcapsule-encapsulated dispersion liquid of the present invention depending on the property of the dispersion medium to be used. As the additives, there are exemplified an anti-oxidizing agent, an anti-foaming agent, an anti-static agent, dye, pigment, a fluorescent whitening agent, and the like.

The microcapsule-encapsulated dispersion liquid to which the above-mentioned additives are blended may be dispersed by a known method, used for the formation of the microcapsule, and may be subjected to insolubilization treatment.

It is possible to bury the various pigments in the gelatin film to conduct colorization. If a pearl pigment of an interface color is buried therein, an image portion of a black color may be subjected to colorization.

In general, a water-based ink composition is prepared by optionally classifying, pH-adjusting, and dehydrating the microcapsule dispersion liquid. In addition, the thus obtained microcapsules may be subjected to dry powdering, and to mixing with an ultraviolet curing resin, an electron radiation curing resin, a hot-melt resin, or the like, thereby being processed into a sheet shape.

For a binder of the water-based ink composition, a known water-soluble polymer or a known resin emulsion may be used, but depending on the components of the binder, some binder may extract the solvent from the microcapsules or may adversely affect by penetrating into the microcapsules, and hence there is a need to care for the binder.

The colorization may be possible by the addition of dye or pigment to the water-based composition. If glycerin, sorbitol, sodium hyaluronic acid, or the like, which may become a plasticizer of gelatin, is added to the water-based composition, flexibility is imparted to the gelatin film after drying, and hence being effective to enhance the pressure strength as well as to reduce influences of electrostatics at the time of electrification and electric discharge.

About an application method, a non-magnetic substance substrate, and a drying or curing method, known methods and substances may be used.

If a transparent film is used for the front surface of the non-magnetic substance substrate, the strength against the pressure with respect to the microcapsules may be increased as the film thickness becomes thicker. However, as the film thickness becomes thinner, the light-absorptive magnetic particles within the microcapsules cohere densely at the time of magnetic printing, resulting in increasing the black color degree and the sharpness. The above-mentioned method of increasing the pressure strength is effected, and the more the particle size of the microcapsule becomes smaller, the thinner transparent film may be used for the front surface, resulting in improvement of the image formed quality.

Employment of dye or pigment on an outside or an inside of the front surface transparent layer enables colorization, and if a pearl pigment of an interference color is used, the colorization of a black color image portion may be made.

Depending on the selection of combination of kinds of the non-magnetic substance substrate and a binder, the non-magnetic substance substrate may be removed.

For utilization of the microcapsule magnetic display to a card, other than a method involving bonding the completed microcapsule magnetic display sheet to the card with a bond or an adhesive, there may employ a method involving applying a water-based composition directly on a part of the card substrate to be laminated, then drying or curing the water-based composition to integrate with the other substrate through thermal lamination, or the like. Further, the microcapsule magnetic display layer, from which the non-magnetic substance substrate is removed, is sandwiched between the card substrates to be laminated through the thermal lamination, or the like, thereby achieving integration.

An application of magnetic field for the formation of character or image through the magnetic migration may also be performed by a known method, and in the case of hand writing, the printing may be effected with a pen-shaped magnet. The pen-shaped magnet provided with a spring is effective to prevent the microcapsules from crushing. The thickness or a magnetic power of the pen-shaped magnet may be selected in accordance with the mobility of the light-absorptive magnetic particles of the microcapsule magnetic display. The formation of the character or image with a known electromagnetic head is also possible only by adjusting and selecting an applied voltage to the microcapsule magnetic display in accordance with the mobility of the light-absorptive magnetic particles.

About erasing, it may be effected by a known method. There is generally employed a method involving scanning a back surface of the microcapsule magnetic display with one-side multipole polarized rubber magnet, in which a magnetic force and a width of the magnet may only be selected in accordance with the mobility of the light-absorptive magnetic particles in the microcapsule magnetic display. At the time of erasing, the light-absorptive magnetic particle conducts a rotation movement within the microcapsule in reply to the scanning of the one-side multipole polarized rubber magnet, and hence as the polarization pitch becomes closer, the diameter of rotation movement becomes small, thereby enhancing the erasing performance. The erasing with a permanent magnet of an electromagnet may be possible.

What is claimed is:

1. A microcapsule magnetic migration display, in which a plurality of microcapsules, in which a dispersion liquid containing an oily dispersion medium having two components of light-absorptive magnetic particles and light-reflective non-magnetic particles dispersed therein is encapsulated to form a microcapsule-encapsulated dispersion liquid, are arrayed on a substrate, and positions of the two components in the dispersion medium are allowed to vertically migrate in the microcapsules by a magnetic field applied from outside the substrate, to thereby form character or image of a black color or a white color on the white color or the black color, respectively, or erase therefrom, wherein:

(1) the microcapsule-encapsulated dispersion liquid comprises one kind or two or more kinds of oily liquids having a flash point of 70° C. or more, a volume density at 15° C. of 0.75 to 0.91 g/cm$^3$, and a kinematic viscosity at 40° C. of 7 mm$^2$/S or less;

(2) the microcapsule-encapsulated dispersion liquid is added with 0.5 to 8.0 wt % of non-ionic surfactant with an HLB value of 5.0 or less, which is liquid under room temperature; and (3) to increase the volume density of the microcapsule-encapsulated dispersion liquid, the microcapsule-encapsulated dispersion liquid is added with solid particles having a true specific gravity exceeding 1.0 and having a particle diameter of 0.1 to 30 μm, to thereby adjust the volume density of the microcapsule-encapsulated dispersion liquid at 15° C. to 1.0 to 1.2 g/cm$^3$.

2. A microcapsule magnetic migration display according to claim 1, wherein the dispersion medium of the microcapsule-encapsulated dispersion liquid comprises a mixture of one kind or more kinds selected from normal paraffins, isoparaffins, and naphthenes.

3. A microcapsule magnetic migration display according to claim 1, wherein the solid particles which are added to increase the volume density of the microcapsule-encapsulated dispersion liquid comprises a mixture of the light-absorptive magnetic particles and the light-reflective non-magnetic particles.

4. A microcapsule magnetic migration display according to claim 3, wherein a particle size range of the microcapsule is 30 to 180 μm.

5. A microcapsule magnetic migration display according to claim 2, wherein the solid particles which are added to increase the volume density of the microcapsule-encapsulated dispersion liquid comprises a mixture of the light-absorptive magnetic particles and the light-reflective non-magnetic particles.

* * * * *

UNITED STATES PATENT AND TRADEMARK OFFICE
CERTIFICATE OF CORRECTION

PATENT NO. : 7,561,140 B1 Page 1 of 1
APPLICATION NO. : 12/230846
DATED : July 14, 2009
INVENTOR(S) : Yasuyuki Kanno It is certified that error appears in the above-identified patent and that said Letters Patent is hereby corrected as shown below:

Title page, item 57,
Line 10, change "dynamic" to --kinematic--.

Signed and Sealed this

Eighth Day of December, 2009

David J. Kappos
*Director of the United States Patent and Trademark Office*